April 17, 1962     J. O. ROESER     3,029,648
HIGH PRECISION NUTATING DEVICE
Filed June 30, 1960
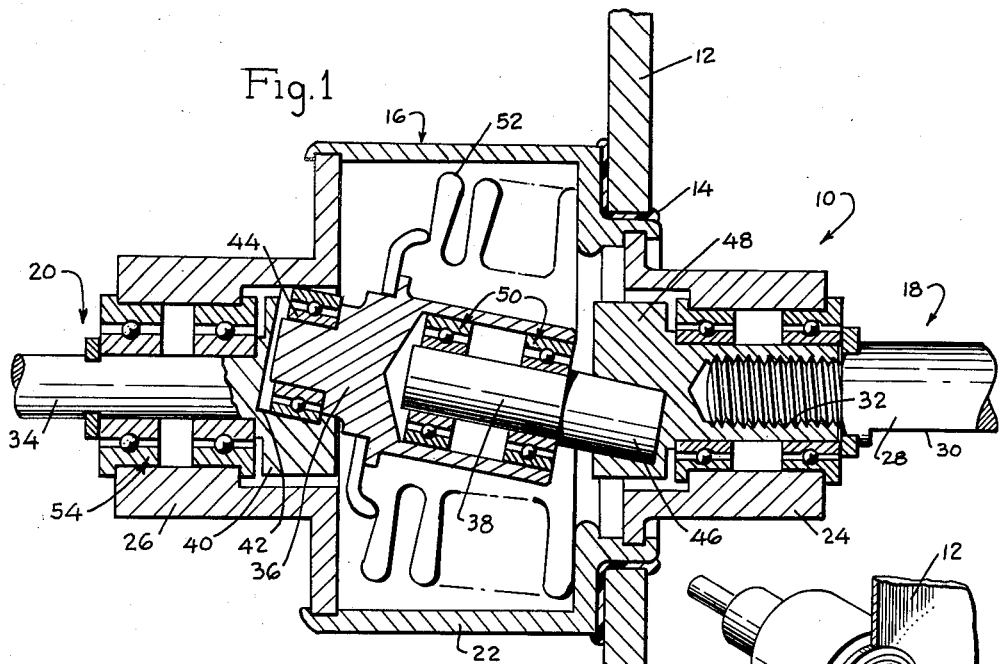
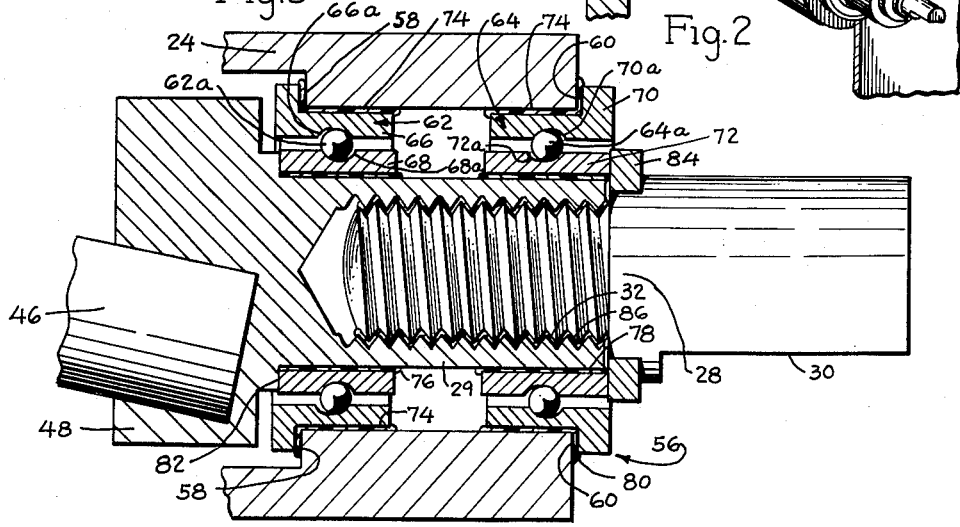
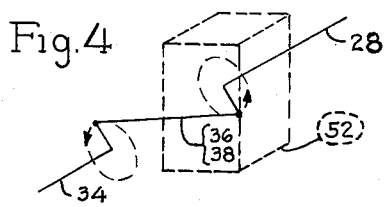
INVENTOR.
John O. Roeser "# United States Patent Office 3,029,648
Patented Apr. 17, 1962

3,029,648
HIGH PRECISION NUTATING DEVICE
John O. Roeser, Park Ridge, Ill.
Filed June 30, 1960, Ser. No. 39,958
7 Claims. (Cl. 74—18.1)

This invention relates to a device for transmitting rotary motion through a positive, flexible seal, requiring no gaskets or sliding seal members and, more particularly, it relates to a device of this nature, wherein there is a high precision in the mechanism to afford minimal backlash between input and output of the device.

Transmission of rotary motion through a positive metal to metal seal, wherein there are no gaskets or sliding seals, a metal bellows providing the flexibility required in the seal between the stationary and moving elements, finds many applications in adjustable instruments, controls or other precision mechanisms such as thermostats, pyrometers and other recording instruments, explosion-proof switches and warning devices in mines, chemical and munitions plants, etc. Also, aircraft instrumentation and computers require high precision, low weight and miniature size rotary seal devices, and, in this latter application, the instant invention is particularly useful.

The instant device is particularly useful wherein the requirements are a 90% efficiency in transmission of power between the input and output shaft and where the leak rate between the sealed area and non-sealed area with a mass spectrometer must be less than $10^{-6}$ cc. per second. Further, the device must be capable of a long and trouble-free seal life, wherein there are repetitive revolutions of the seal in the order of hundreds of thousands. To this end, a flexible metal bellows and nutatory motion gives exceptional results.

It is, thus, a general object of this invention to provide a high precision rotary seal device, having the aforenoted characteristics.

A further object of this invention is to provide a rotary seal device that is light in weight, has high precision, and is relatively simple to manufacture by mass manufacturing techniques.

A further object of this invention is to provide a rotary seal device of the aforenoted characteristics, wherein ordinary ball-bearings are used, and are preloaded in such a manner as to impart a high precision that eliminates radial loosensess to afford the function of minimal backlash between input and output shaft.

It is a further object of this invention to preload ball-bearings surrounding the input shaft to eliminate radial looseness thereof and then retain said ball-bearings in such preloaded condition throughout the operative life of the device.

It is a further object of this invention to provide a nutating device of the aforenoted characteristics, wherein the crank-like motion of the input shaft, as applied to the nutating members which imparts a multiplication of error in mounting of the input shaft by a large factor, is compensated for by a preloading of the input shaft bearings, by use of a two part input shaft which is adjusted at the factory during the manufacture thereof, to eliminate all radial looseness in the device and is maintained in its desired relationship by suitable cement means to afford long, trouble-free, high precision operation of the device.

The novel features that are characteristic of the invention are set forth with particularity in the appended claims. The invention, itself, both as to its organization and its method of operation, together with additional objects and advantages, can be best understood by the following description of a specific embodiment, when read in connection with the accompanying drawings, in which:

FIG. 1 is a sectional view through the device;
FIG. 2 is a perspective view of the device mounted to a housing, a portion being shown in section;
FIG. 3 is an enlarged fragmentary view of a portion of the device shown in FIG. 1; and
FIG. 4 is a semidiagrammatic showing of the movements of the parts of the device.

As shown in FIG. 2 of the drawings, the nutating assembly 10 is mounted to a housing 12 (a portion being shown as a panel) and is sealed thereto by a suitable sealing means 14. The housing means 16 for the nutating device has an input end 18 and an output end 20, the input end and output end being on opposite sides of the housing means 12. The nutating housing means 16 comprises a central annular member 22 which is sealingly attached to a reduced diameter input bushing 24 at one end and is sealingly attached to another reduced diameter output bushing 26 at the other end. Input shaft means in the form of a two part shaft having portions 28 and 29 is shown in the enlarged FIG. 3, portion 28 being flattened at 30 for engagement by suitable driving means as desired. The input shaft portions 28 and 29 are threadingly mounted to each other at 32 for purposes hereinafter appearing.

The output shaft 34 is located at the opposite end of the device 10 and is connected to the input shaft by a bearing cup member 36 and a canted shaft 38. An enlarged head portion 40 of the output shaft 34 is formed with a U-shaped slot or groove 42 which mounts a ball-bearing 44 mounted on the end of the bearing cup 36. The end slot or groove 42 is so arranged relative to the head portion 40 that it is offset from the axis of the shaft 34 (which is the same as the axis of the input shaft 28).

The canted shaft member 38 has an enlarged head portion 46 which is fixedly mounted in an enlarged head portion 48 of the input shaft portion 29. The mounting of the shaft 46 in the canted relationship shown provides a nutating movement of shaft 38 and bearing cup 36 such that input motion to shaft 28, 29 in a rotary direction is translated to output shaft 34. The reduced diameter portion of the canted shaft 38 serves to mount a pair of spaced ball-bearings 50 to afford relative motion between the bearing cup 36 and the canted shaft 38 which, it will be appreciated, acts as an extension of the input shaft due to the fixedly mounting thereof on the enlarged head portion 48. A metal to metal seal is provided by a very thin bellows 52 which is attached at one end to the bearing cup 36 and at the other end to the central member 22 to the housing means 16. Thus, in a sense, the output shaft 34 is disposed on one side of the housing means 12 and the input shaft means is disposed on the other side thereof, in terms of a sealing relation therebetween.

Since the canted shaft 38 is offset relative to the axis of the two part input shaft 28—29, any radial looseness in the mounting of the input shaft 28—28, relative to the housing input bushing 24 will be multiplied by the mechanical relationship therebetween. In the arrangement shown, it has been found that an error in radial looseness will multiply itself on the order of nine times between the input and the output shaft. To alleviate any radial looseness for the mounting of the input shaft, and, thus, eliminate a backlash between input and output shafts, a preloaded bearing arrangement is provided. The bearing means 56 for the input end of the device, may, also, be used for the output end of the device 54, particularly when it is desired to have a reversible motion. Thus, while I have elected to show the preloaded bearings only associated with the input end of the device, it is to be remembered that it applies equally
"

as well to the output end of the device and may, also, be applied to the canted shaft 38 and the bearing cup 36, when ultra-high precision is required.

As shown in FIG. 3, the input bushing 24 is formed with spaced shoulders 58 and 60, the latter being the end surface of the bushing. A pair of ball-bearings 62 and 64 are respectively mounted adjacent the shoulders 58 and 60 and are fixed in place, relative thereto by cement means 74 in the form of the epoxy resin. The axially inner ball-bearing 62 is formed with an outer half 66 and an inner half 68 and the ball-bearing 64 is formed with an outer half 70 and an inner half 72. Each of the halves of each of the bearings are formed with suitable grooves in opposed relation, the grooves being denominated 66a, 68a, 70a and 72a, as related to the individual halves of the bearings without the suffix a. Conventional balls 62a and 64a are disposed in the grooves for cooperation therewith in standard fashion. As shown in FIG. 3, the inner halves of 68 and 72 of each bearing 62 and 64 are fixedly mounted to input shaft portion 29 and preferably are mounted thereon by a glue means, such as epoxy resin 76, 78.

The inner half 68 of the axially inner ball bearing 62 is firmly attached to shaft portion 29 adjacent to a shoulder 82 which is formed thereon and the axially outwardly inner half 72 of bearing 64 is mounted adjacent to a stop ring shoulder 84 formed on the other input shaft portion 28. The threaded engagement of portions 28 and 29 at 32 will cause a compression force between the two shoulders to move the two bearing halves 68 and 72 toward each other to thereby move the grooves therein, such that the balls will ride on the side thereof and, thereby eliminate any radial play in the bearings. This loads the bearings in such a manner that dimensional variations caused by necessary tolerance in the manufacture of the bearings are eliminated. To maintain this preloaded condition, epoxy resin 86 is disposed between the threaded portions at 32 of the two-part input shaft and this quickly sets and maintains the preloaded condition of the bearings throughout the operative life of the device.

Although a specific embodiment of the invention has been shown and described, it is with full awareness that many modifications thereof are possible. The invention, therefore, is not to be restricted except insofar as is necessitated by the prior art and by the spirit of the amended claims.

What is claimed as the invention is:

1. In a high precision rotary seal device comprising housing means having a first axis, input shaft means located on said first axis in said housing and having a portion offset from said said axis, output shaft means located on said first axis having a portion offset therefrom, and interconnecting means associated in rotary force transmitting relationship to both of said offset portions and flexibly sealed to said housing means about said first axis; the improvement comprising means for reducing radial looseness between said housing means and said input shaft means to reduce backlash between said input shaft means and output shaft means comprising bearing means having a portion fixed to said housing means and a portion fixed to said input shaft means, and means associated with said input shaft means for preloading said bearing portions to eliminate radial looseness, comprising a first shaft portion having a shoulder engaging said bearing means and a second shaft portion threadingly connected to said first shaft portion and, also, having a shoulder engaging another portion of said bearing means whereby each shoulder is movable relative to the other shoulder to preload the bearing means portions in engagement therewith.

2. In a high precision nutating device comprising housing means, input shaft means having a portion located in said housing means, output shaft means also having a portion located in said housing means, and interconnecting means associated in nutating rotary force transmitting relationship to said input and output shafts and sealed to said housing means; the improvement comprising means for reducing radial looseness between said housing means and said input shaft to reduce backlash between said input shaft means and output shaft means comprising first and second spaced bearings, each having an inner and outer half formed with grooves, balls for said grooves, each of said outer halves being fixed to said housing means and each of said inner halves being fixed to said input shaft means, and means associated with said input shaft means for preloading said bearings to eliminate radial looseness, comprising a first shaft portion having a shoulder engaging one of said inner halves of the bearings and a second shaft portion threadingly connected to said first shaft portion and, also, having a shoulder engaging the other inner half of the bearings whereby each shoulder is movable relative to the other shoulder to move the inner half of the bearing in engagement therewith to shift the relative position of the grooves therein relative to its opposite groove to preload the bearings.

3. In a high precision nutating device comprising housing means, input shaft means having a portion located in said housing means, output shaft means also having a portion located in said housing means, interconnecting means associated in nutating rotary force transmitting relationship to said input and output shafts and sealed to said housing means; the improvement comprising means for reducing radial looseness between said housing means and said input shaft means to reduce backlash between said input shaft means and output shaft means comprising first and second spaced bearings, each having an inner and outer half formed with grooves, balls for said grooves, each of said outer halves being fixed by glue means to spaced portions of said housing means and each of said inner halves being fixed by glue means to spaced portions of said input shaft means, and means associated with said input shaft means for preloading said bearings to eliminate radial looseness, comprising a first shaft portion having a threaded portion and a shoulder engaging one of said inner halves of the bearings and a second shaft portion having a threaded portion and threadingly connected to said first shaft portion and, also, having a shoulder engaging the other inner half of the bearings whereby each shoulder is movable relative to the other shoulder to move the inner half of the bearing in engagement therewith to shift the relative position of the grooves therein relative to its opposite groove to preload the bearings, and glue means associated with said threaded portion of each of said input shaft portions to retain the relative position thereof during the operative life of said device.

4. The device set forth in claim 3 wherein the glue means comprises epoxy resin.

5. The device set forth in claim 3 wherein the inner halves of the spaced bearings are moved toward each other by said threaded connection of said first and second portions of said input shaft.

6. A high precision nutating device comprising first housing means having wall means with an aperture, second housing means sealingly fixed to said first housing means and fixed to said wall means surrounding said aperture, input shaft means generally transverse to said wall means and extending through said aperture and having a portion located in said first and second housing means, said input shaft means having first and second relatively movable portions defining oppositely facing shoulders, output shaft means having a portion located in said second housing means, and interconnecting means located in said second housing means and associated in nutating rotary force transmitting relationship to said input and output shafts and fixedly sealed to said second housing means, and means for reducing radial looseness between said second housing means and said input shaft to reduce backlash between said input shaft means and output shaft means comprising an annular cylindrical member concentric with said aperture and said input shaft and fixed to said second housing means, said annular member having spaced end surfaces, a bore and a counterbore defining a radial shoulder, first and second spaced bearing portions disposed in said bore, one being disposed in engagement with said radial shoulder and another being disposed in engagement with one of said end surfaces, third and fourth bearing portions co-acting respectively with said first and second bearing portions and respectively engaging said first and second oppositely facing shoulders of said input shaft means, and means for moving and fixing the relative position of said first and second input shaft portions to cause movement of said third and fourth bearing portions relative to said first and second bearing portions to eliminate radial looseness between said input shaft means and said annular member whereby backlash between said input and output shaft means is substantially eliminated.

7. The combination set forth in claim 6, wherein the output shaft means is formed similarly to said input shaft means, and another annular member is disposed surroundingly thereto with first, second, third and fourth bearing means associated therewith whereby backlash is reduced for reversible motion of said device.

References Cited in the file of this patent

UNITED STATES PATENTS

| | | |
|---|---|---|
| 578,892 | McCue | Mar. 16, 1897 |
| 634,090 | Mott | Oct. 3, 1899 |
| 1,731,009 | King | Oct. 8, 1929 |
| 1,881,750 | Llewellyn | Oct. 11, 1932 |
| 2,472,010 | Gilman | May 31, 1949 |
| 2,770,139 | Shen et al. | Nov. 13, 1956 |
| 2,978,914 | Gut | Apr. 11, 1961 |